United States Patent

[11] 3,621,352

[72] Inventor Edward H. Dinger
 Waynesboro, Va.
[21] Appl. No. 808,443
[22] Filed Mar. 19, 1969
[45] Patented Nov. 16, 1971
[73] Assignee General Electric Company

[54] INVERTER-CONTROL SYSTEM FOR AC MOTOR WITH PULSE-LOCKED CLOSED LOOP FREQUENCY MULTIPLIER
 8 Claims, 2 Drawing Figs.
[52] U.S. Cl............................................. 318/227,
  318/231, 318/341, 321/5, 328/134
[51] Int. Cl....................................................... H02p 5/40,
  H02m 7/20
[50] Field of Search........................................ 307/233,
  221, 225; 328/132, 134; 331/23, 24, 17, 18;
  318/314, 312, 318, 329, 227, 230, 231; 321/4, 5

[56] References Cited
 UNITED STATES PATENTS
 3,474,320 10/1969 Chandler...................... 321/5
 3,110,853 11/1963 Jones............................ 318/312
 3,308,387 3/1967 Hackett........................ 328/134 X
 3,337,814 8/1967 Brase et al. ................... 328/134 X
 3,448,402 6/1969 Booker, Jr. et al............ 328/134 X
 3,500,226 3/1970 Eisenberg..................... 331/17 X Primary Examiner—Oris L. Rader
Assistant Examiner—Robert J. Hickey
Attorneys—Joseph B. Forman, Michael Masnik, Frank L. Neuhauser and Oscar B. Waddell ABSTRACT: The invention is a closed loop pulse-locked frequency multiplier. A master pulse train is applied to a digital discriminator, the output of which is in turn applied to a voltage controlled oscillator. The oscillator generates a pulse train having a repetition rate that is a multiple of the repetition rate of the master pulse train. The generated pulse train is fed back to the digital discriminator by a divider having a dividing factor equal to the multiplying factor of the oscillator.

INVENTOR
EDWARD H. DINGER
BY Michael Masnik
HIS ATTORNEY 3,621,352

1

INVERTER-CONTROL SYSTEM FOR AC MOTOR WITH PULSE-LOCKED CLOSED LOOP FREQUENCY MULTIPLIER

FIELD OF THE INVENTION

This invention relates to numerical control arrangements and more particularly it relates to closed loop pulse-synchronized frequency multipliers.

HISTORY OF THE ART

In application Ser. No. 742,004, filed July 2, 1968, now U.S. Pat. No. 3,559,017, assigned to the assignee of the present application and copending herewith, there is described a motor control system which precisely locks the speed of the motor being controlled to a fraction of a master pulse source. The system described is appropriate for use in a motor-speed-tracking system where one or more motors exactly track a master motor at different fractional speeds. Since each of the motors being controlled in this system depends for its AC drive voltage upon the pulses triggering the SCR's of an inverter, it is desirable for precise speed control to be able to change the pulse rate to the inverter by small amounts. To obtain this high resolution control, it is necessary to obtain a master pulse source of high frequency.

It is accordingly an object of the present invention to provide an improved signal processing arrangement.

It is accordingly an object of the present invention to provide a frequency multiplier with a constant multiplying factor over a wide range of input frequencies.

It is another object of the present invention to provide a closed loop pulse-locked frequency multiplier.

Because the motor-control system described in the above-mentioned copending application employs digital discriminators for a pulse-by-pulse comparison of the master frequency source with the local oscillator in the speed control circuit for the motor, it is another object of the present invention to provide a frequency multiplier capable of producing evenly spaced pulse trains over a wide frequency range.

The copending application also describes how several motors can be controlled to track at different fractional speeds the speed of a master motor. Since even here there is a general requirement that the master pulse source from which each control system derives its speed demand be of a high frequency, a frequency multiplier is needed. In addition, many applications require that the same speed relationship between the slave motors in a speed-tracking system be maintained while the master motor is being raised and lowered in speed. It is therefore another object of the present invention to provide a frequency multiplier having a rate of change control which is less than or equal to the slowest rate of change speed command for the motor controlled having the greatest inertia.

BRIEF DESCRIPTION OF THE INVENTION

In general, a voltage-controlled oscillator capable of producing a frequency considerably higher than the master pulse train receives an average DC voltage from a digital discriminator which receives the master pulse train as one input and the output of the oscillator divided by a frequency divider having a division factor equal to the multiplication factor of the oscillator forming a second input to the digital discriminator. The voltage-controlled oscillator is immediately preceded by an acceleration-deceleration circuit which limits the rate of change of the output from the discriminator as it is applied to the oscillator. This permits the motor-control system which is supplied with the output of the oscillator to have a gradually changing master pulse source which it can readily follow.

BRIEF DESCRIPTION OF THE DRAWINGS

These and other objects and features of the invention will be better understood from the detailed description of an exemplary embodiment of the invention as shown in the drawings in which:

2

Figure 1:
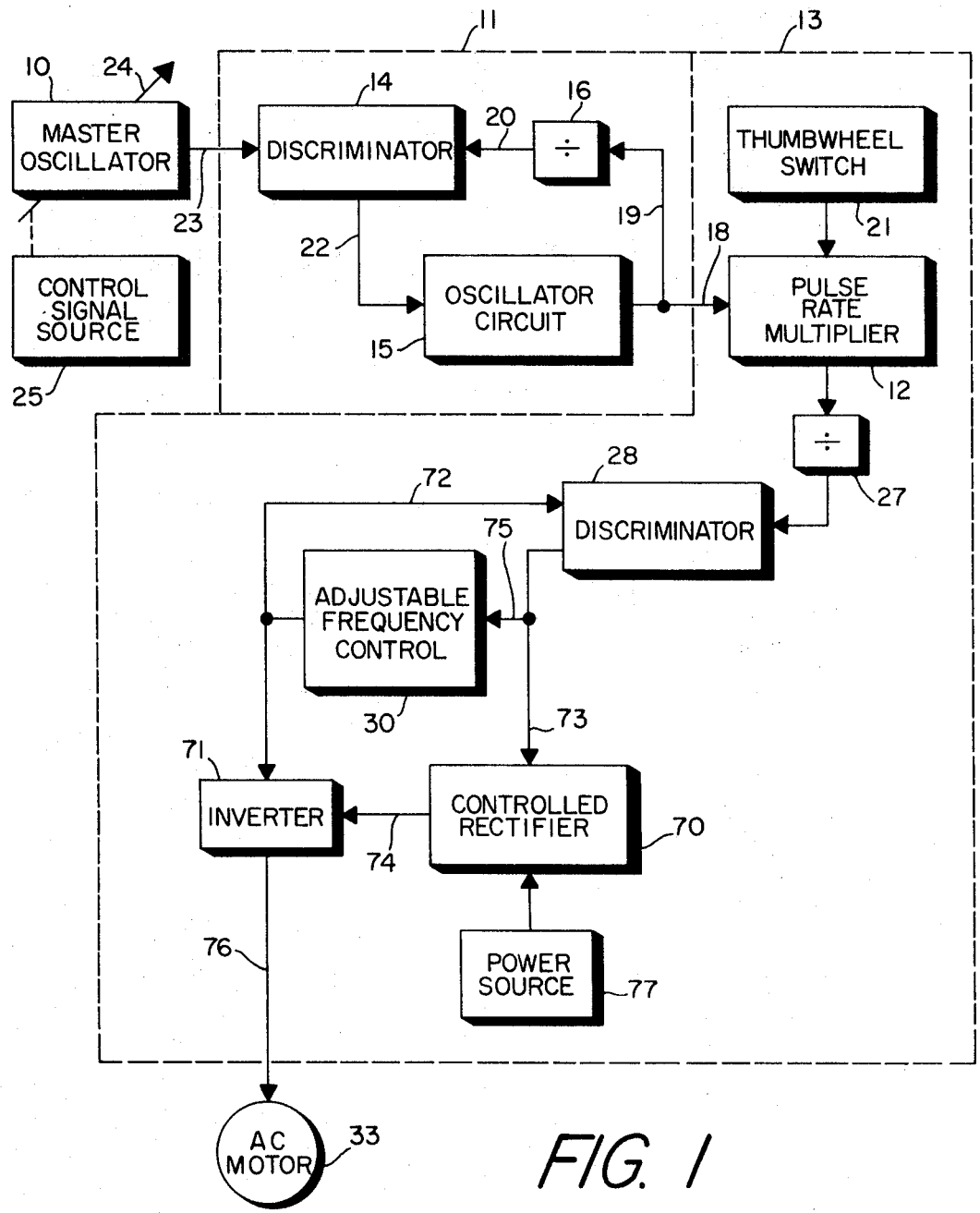
Figure 2:
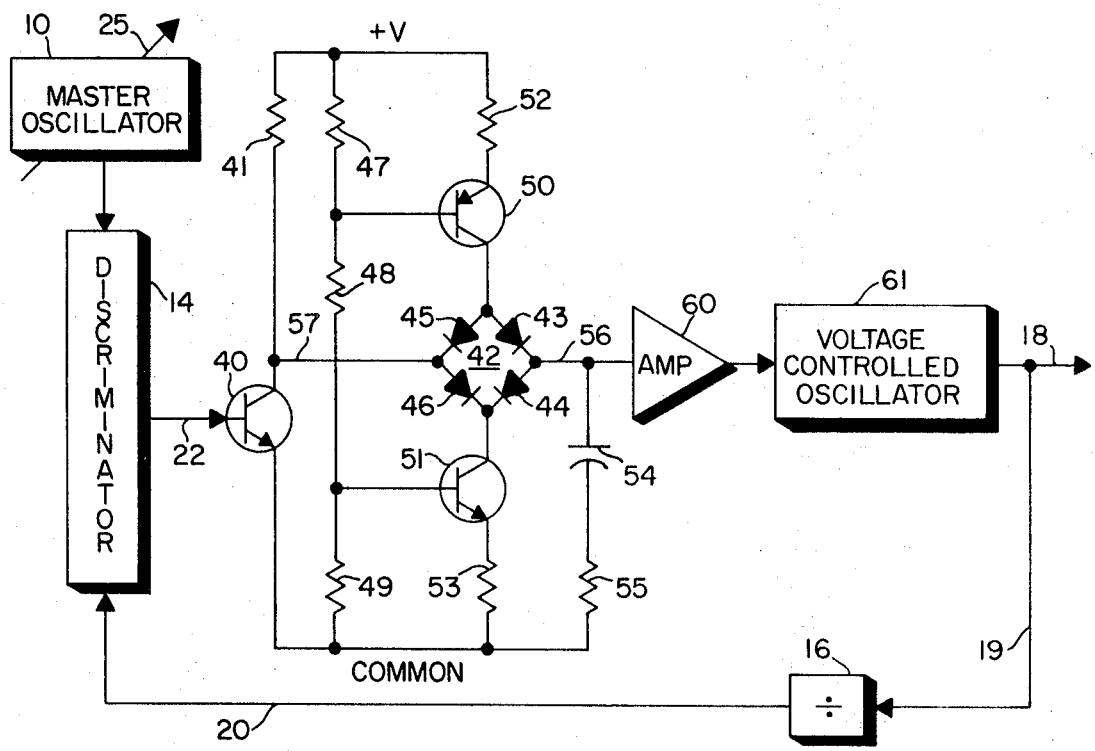

FIG. 1 is a block diagram of a motor-control-circuit system with a frequency multiplier according to the invention, and FIG. 2 is a partial block and partial schematic diagram of the frequency multiplier according to the invention.

DESCRIPTION OF THE INVENTION

Referring now to the drawings wherein like reference numerals refer to like parts throughout and where possible reference numerals refer to the same parts shown in the above-mentioned copending application, there is shown in FIG. 1 a motor-control system including a portion of the synchronizing motor-control circuit described in the above-mentioned copending application and the improvement comprising a frequency multiplier according to the invention. In said copending application and shown again here in FIG. 1, the motor-control system where the adjustable frequency control 30 for an AC motor 33 is synchronized on a pulse-by-pulse basis with a master oscillator 10 by a pulse-selecting circuit including the pulse-rate multiplier 12 which selects a number of the pulses from the master oscillator according to the setting of the thumbwheel switch 21 which provides a multiplying factor signal to 12. The distribution of the pulses is evenly regularized by the frequency divider 27 and compared with the output of the adjustable frequency control oscillator 30 by a frequency discriminator 28.

The control signal at the output of frequency discriminator 28 is applied over connection 73 to controlled rectifier 70 to control the amplitude of direct voltage applied by 70 from a power source 77 to inverter 71 over connection 74. This control signal from 28 is also applied over connection 75 to control the recurrence rate of gating signals at the output of adjustable frequency control 30 which in turn control the recurrence rate at which inverter 71 converts the applied direct voltage from 70 and applies it over connection 76 for operating a load, such as motor 33. The gating signals provided by 30 are applied over connection 72 to the frequency discriminator 28 to cause the adjustable recurrence rate of gating signals from 30 to follow the recurrence rate of signals applied to 28 from 27. As has been pointed out, such a system provides precise control of the speed of a motor by locking the adjustable frequency control, the pulses of which formulate the AC voltage applied to the motor to a precise frequency standard which for fixed frequencies might be a master oscillator 10 such as a crystal oscillator or for varying frequencies might be, for example, a control source 25 for the oscillator 10 or a tachometer output from a master motor which is being tracked.

Because the system shown in FIG. 1 in dashed block 13 first reduces the pulse-repetition rate of the master oscillator in the pulse-rate multiplier by its selection and action and there is a further reduction in the pulse rate by the divider 27 and since the action of the divider 27 is to regularize the pulse rate and this more precisely obtained when the original pulse rate is high, it is very often desirable to have some means of raising the pulse rate of the master oscillator. This is especially true where the master oscillator is the tachometer output of a motor. Very often the tachometer is limited to a pulse rate which is too low for precise operation of the digital motor-control circuit described in the copending application.

FIG. 1 accordingly shows in dashed block 11 a frequency multiplier capable of tracking the variations in recurrence rate of the signals available at the output of the master oscillator 10 and raising the frequency on a linear basis for wide ranges of frequency change of the master oscillator. This frequency multiplier includes a frequency discriminator 14, a voltage-controlled oscillator circuit 15 and a frequency-divider circuit 16.

Discriminator 14 can be of the same type as discriminator 28 which is described in detail in the above-mentioned copending application and is shown in FIG. 5 of that application. Briefly this discriminator comprises three flip-flops, each receiving pulses from the master oscillator and from the oscillator circuit 15 after being divided by the dividing circuit 16. The flipflops are steered in such a way that if the master pulse train repetition rate exceeds the oscillator 15 repetition pulse rate as applied to the discriminator on lead 20, one of the three flip-flops will provide an output voltage of one polarity. When the oscillator divided output exceeds the repetition rate of the master pulse train another of the flip-flops will provide an output of the opposite polarity. When the repetition rates of both of these signals become equal, the third flip-flop will be activated to provide a pulsating negative and positive output of substantially equal duration such that the capacitor in the acceleration-deceleration circuit which will be described with reference to FIG. 2 below, maintains the voltage constant for the voltage control oscillator so that the output at this oscillator is locked at the predetermined multiple of the master oscillator pulse-repetition rate.

Referring now to FIG. 2, the embodiment of the invention of the frequency multiplier being described is shown in more detail.

FIG. 2 shows that capacitor 54 indirectly stores the output from the discriminator 14. This capacitor forms part of an acceleration-deceleration circuit generally shown at 42. A zero or negative voltage output from the discriminator 14 at the base of transistor 40 turns this transistor off permitting a positive blocking voltage to appear at point 57 to permit a charging current to be applied to capacitor 54. With 57 positive, diode 46 conducts connecting the cathode of 44 to +V through diodes 46 and resistor 41. This blocks conductions of diode 44. With 57 being positive, the cathode of diode 45 is connected through resistor 41 to +V. This blocks conduction of diode 45. 54 then charges through 43 and the emitter collector path of 50 and emitter resistor 52. A positive output from the discriminator 14 at the base of transistor 40 turns this transistor on causing the voltage at points 57 to go a low value thereby causing a discharging current to be applied to capacitor 54. With 57 at a low-voltage value, diode 45 conducts connecting the anode of 45 to the common bus through 45 and the collector emitter path of transistor 40. This blocks conduction of 43. With 57 at a low-voltage value, the anode of 46 is connected to the common bus through the collector to emitter path of transistor 40. This blocks conduction of 46. 54 then charges through 44, the emitter to collector path of 51 and emitter resistor 53. Thus capacitor 54 charges or discharges at fixed charge and discharge rates when 22 is negative or positive and 57 is positive or negative respectively. When the pulse rate of signals fed into the discriminator at 20 agrees exactly in frequency with the frequency of signals fed into the discriminator and the master oscillator, the voltage at 22 will be alternately positive and negative, point 57 will be negative and positive and capacitor 54 will discharge and charge respectively. The frequency of alternation of the voltage at 22 at this condition will be the same as the master pulse frequency and the positive and zero portions of the frequency appearing at point 22 will automatically assume a relationship so that the result of the alternate charge and discharge will result in no net further change in the voltage across capacitor 54. The rate of charge and discharge of capacitor 54 is determined by transistors 50 and 51 respectively with their associated resistors 52 and 53. When repetition rate of the master oscillator is equal to the repetition rate of the divided output from the voltage-controlled oscillator 61 and evenly spaced negative and positive pulses are applied to the acceleration-deceleration circuit, the currents through resistors 52 and 53 arrive at values such that the rate of charge is slightly greater than the rate of discharge to make up for the losses in the circuit so that the voltage on capacitor 54 is maintained constant. Amplifier 60 which receives the output which is responsive to the voltage on the capacitor 54 merely serves to isolate the charge on the capacitor from the voltage-controlled oscillator 61.

The voltage-controlled oscillator 61 may be any linear free-running voltage-controlled oscillator such as the one shown in FIG. 13.52 on Page 337 of the General Electric Transistor Manual, 7th Edition. Such an oscillator circuit has a fixed multiplication factor for a wide range of output frequencies and in the circuit shown will maintain this constant multiplication factor for a wide range of master oscillator frequencies. The output of the voltage-controlled oscillator developed on lead 18 of FIG. 1 is applied to the motor control system at the pulse rate multiplier 12. The output of the voltage-controlled oscillator is also fed back in a closed loop via line 19, divider 16 and line 20 to the discriminator 14. Because the output of the voltage-controlled oscillator 61 is to be a multiple of the master oscillator frequency applied to the discriminator, it is necessary to decrease the frequency of this output at 18 by the same multiple and this is done by the dividing circuit 16 which may comprise, for example, a series of flip-flops of appropriate number such that the division factor is equal to the multiplication factor of the voltage-controlled oscillator.

It should be noted that, the master oscillator 10 has its output signals varied or adjusted in accordance with a control 24 coupled to a control signal source 25. In a particular embodiment 10 and 24 may be a digital tachometer for providing pulses having a repetition or recurrence rate proportional to the angular velocity of a shaft. Where a fixed recurrence rate of master oscillator signals is desired, item 10 may be a crystal-controlled oscillator. Also item 10 may comprise a relaxation oscillator of fixed or adjustable frequency.

While a particular embodiment of the invention has been described, it is to be understood that many variations of the circuits shown can be employed and it is intended that all such variations within the scope of the invention as defined by the claims shall become subject thereto.

What is claimed as new and desired to be secured by Letters Patent of the United States is:

1. In combination,
 means for generating a pulse train having substantially even spaced pulses with a repetition rate determined by the amplitude of the signal applied to said means;
 a master pulse train;
 pulse-rate-dividing means;
 pulse-rate-comparison means responsive pulse by pulse to said master pulse train and to the generated pulse train divided by said pulse-rate-dividing means to indicate any difference in pulse repetition rates,
 the signal applied to said means for generating being said indicated difference, a control rectifier for producing direct voltage, an inverter for converting said direct voltage to alternating voltage, and means responsive to said generated pulse train for adjusting the amplitude of said direct voltage of said rectifier and the frequency of inverting by said inverter as a function of the frequency of said generated pulse train.

2. In a motor-control system including a digital-pulse-selecting system for selecting a predetermined fraction of a master source of pulses to control pulse by pulse speed of each motor being controlled, a pulse-locked closed loop frequency multiplier for raising the frequency of said master source to provide higher resolution control of motor speed, said frequency multiplier comprising:
 an oscillator;
 frequency dividing means;
 frequency-difference-detecting means responsive to the pulse repetition rate of said oscillator divided by said frequency-dividing means and to repetition rate of input pulses from a master source on a pulse-by-pulse basis for indicating any difference in pulse repetition rate,
 said oscillator being responsive to the indicated difference to produce a predetermined multiple of the input pulse repetition rate, and means for controlling the speed of said motor on a pulse-to-pulse-basis comprising means responsive to the pulse repetition rate of said oscillator for concurrently and proportionately controlling the voltage and frequency of electrical power applied to said motor.

3. A pulse-locked closed loop frequency multiplier as recited in claim 2 further including means responsive to the output of said detecting means for controlling the rate of change in frequency produced by oscillator.

4. In a motor-control system including a digital-pulse-selecting system for selecting a predetermined fraction of a master source of pulses to control pulse-by-pulse speed of each motor being controlled, a pulse-locked closed loop frequency multiplier for raising the frequency of said master source to provide higher resolution control of motor speed, said frequency multiplier comprising:
   an oscillator;
   frequency dividing means;
   frequency-difference-detecting means responsive to the pulse repetition rate of said oscillator divided by said frequency-dividing means and to repetition rate of input pulses from a master source on a pulse-by-pulse basis for indicating any difference in pulse repetition rate,
   said oscillator being responsive to the indicated difference to produce a predetermined multiple of the input pulse repetition rate, and means for controlling the speed of said motor on a pulse-to-pulse basis comprising means responsive to the pulse repetition rate of said oscillator for concurrently and proportionately controlling the voltage and frequency of electrical power applied to said motor,
   said pulse-locked closed loop frequency-multiplier-including means responsive to the output of said detecting means for controlling the rate of change in frequency produced by said oscillator,
   and said means for controlling said rate of change of frequency being a timed acceleration-deceleration circuit providing a constant change rate signal at its output regardless of the change rate of the signal applied thereto, the change rate of said acceleration-deceleration circuit being less than or equal to the rate required by the motor having the slowest speed-change rate.

5. An arrangement for energizing a load with voltage of a commanded frequency and amplitude comprising:
   a source of a control signal,
   an inverter for converting direct voltage to alternating voltage,
   controlled means for applying direct voltage to said inverter when coupled to an external source of power,
   means responsive to said control signal for providing gating signals to said inverter at a repetition rate proportional to a characteristic of said control signal,
   means responsive to said control signal for adjusting the amplitude of the direct voltage applied from said controlled means to said inverter to be proportional to said characteristic of said control signal,
   said inverter responsive to said provided signals to invert said adjusted amplitude direct voltage applied to said inverter for providing said voltage of commanded frequency and amplitude,
   said source of a control signal comprising a master oscillator for producing first signals of a first recurrence rate,
   a source of a second signal responsive to an applied third control signal for generating second signals having a recurrence rate higher than said first signals and which are proportional to a characteristic of said third control signal,
   means for dividing the recurrence rate of said second signals to provide divided recurrence rate second signals,
   a first frequency discriminator responsive to said first signals and said divided recurrence rate second signals to provide said third signal,
   a pulse-rate multiplier,
   a source of a multiplying factor signal,
   said pulse-rate multiplier responsive to said second signals for producing fourth signals having a recurrence rate related to said second signals by the multiplier factor of said multiplying factor signal,
   a second frequency discriminator responsive to said fourth signals and said gating signals for said inverter for causing the recurrence rate of control signals available from said second discriminator to follow the recurrence rate of signals available from said pulse-rate multiplier.

6. An arrangement according to claim 5 further comprising means for dividing the recurrence rate of said signals available from said pulse-rate multiplier to cause said control signals to follow the divided recurrence rate of signals available from said pulse-rate multiplier.

7. A pulse-locked closed loop frequency multiplier comprising:
   an oscillator,
   frequency-dividing means, frequency-difference-detecting means responsive to the pulse-repetition rate of said oscillator divided by said frequency-dividing means and to the repetition rate of input pulses from a master source on a pulse-by-pulse basis for indicating any difference in pulse repetition rate, said oscillator being responsive to the indicated difference to produce a predetermined multiple of the input-pulse-repetition rate, said detecting means producing a first signal when the repetition rate of the input pulse train exceeds the divided repetition rate of oscillator pulses, a second signal when the divided repetition rate of oscillator pulses exceeds the repetition rate of the input pulse train and alternates between first and second signals when substantially equal repetition rates are detected, and means responsive to the output of said detecting means for controlling the rate of change in frequency produced by said oscillator, said last-named means for controlling comprising a timed acceleration-deceleration circuit providing a constant change-rate signal at its output regardless of the change rate of the signal applied thereto, said timed acceleration-deceleration circuit supplying said indicated difference from said detecting means to said oscillator with the change rate thereof thus modified.

8. An arrangement for energizing a load with voltage of a commanded frequency and amplitude comprising:
   a source of a control signal,
   an inverter for converting direct voltage to alternating voltage,
   controlled means for applying direct voltage to said inverter when coupled to an external source of power,
   means responsive to said control signal for providing gating signals to said inverter at a repetition rate proportional to a characteristic of said control signal,
   means responsive to said control signal for adjusting the amplitude of the direct voltage applied from said controlled means to said inverter to be proportional to said characteristic of said control signal,
   said inverter responsive to said provided signals to invert said adjusted amplitude direct voltage applied to said inverter for producing said voltage of commanded frequency and amplitude,
   said source of a control signal comprising a master oscillator for producing first signals of a first recurrence rate,
   a source of a second signal responsive to an applied third control signal for generating second signals having a recurrence rate higher than said first signals and which are proportional to a characteristic of said third control signal,
   means for dividing the recurrence rate of said second signals to provide divided recurrence rate second signals,
   a first frequency discriminator responsive to said first signals and said divided recurrence rate second signals to provide said third signal,
   a second frequency discriminator responsive to said second signals and said gating signals for said inverter for causing the recurrence rate of control signals available from said second discriminator to follow the recurrence rate of signals available from said pulse-rate multiplier.